March 15, 1932.  H. A. BRASSERT  1,849,658
APPARATUS FOR TREATMENT OF IRON ORE
Filed Feb. 4, 1929
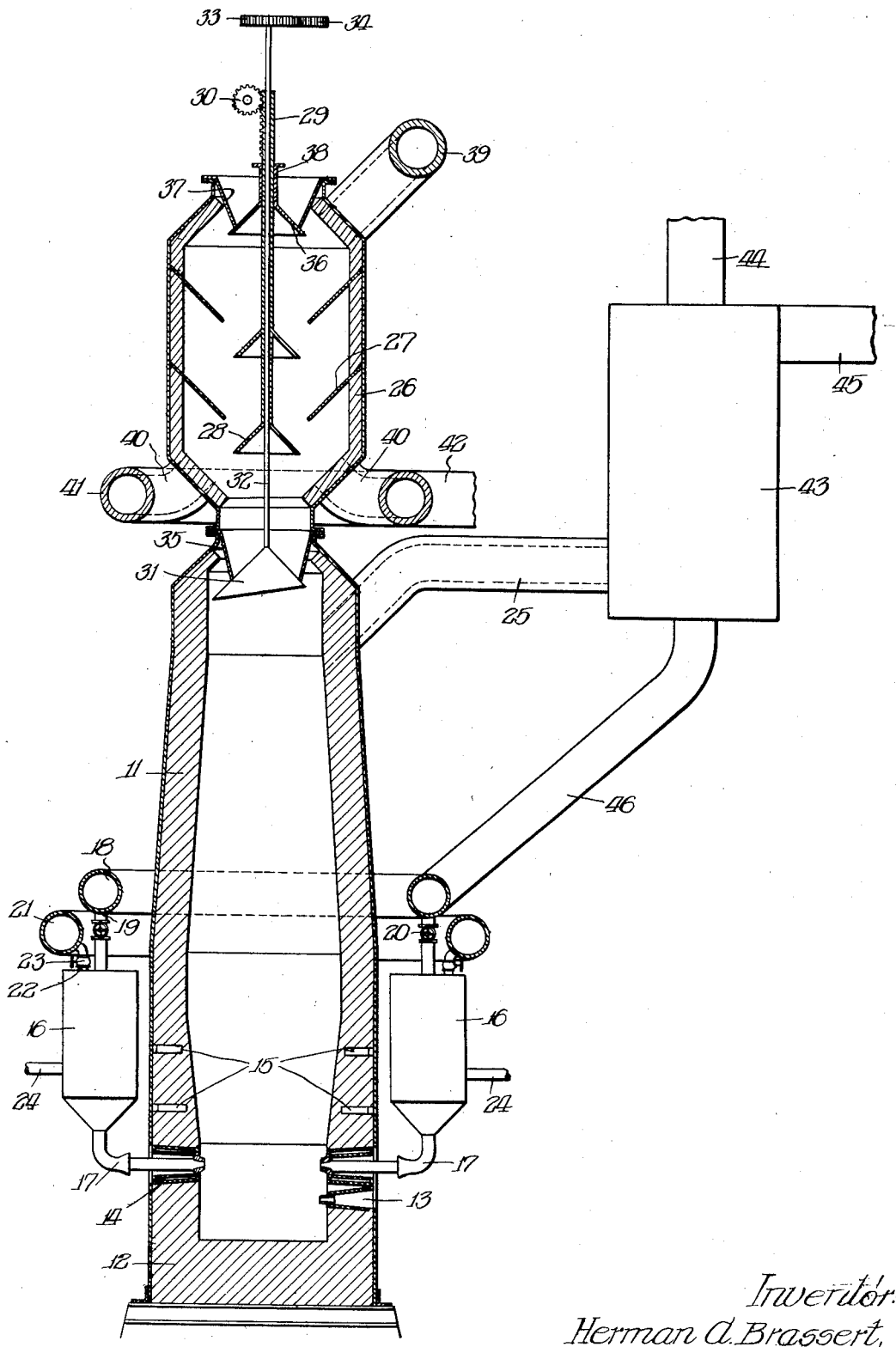
Inventor:
Herman A. Brassert,
By Wilkinson Huxley Byron & Knight
Attys Patented Mar. 15, 1932

1,849,658

UNITED STATES PATENT OFFICE

HERMAN A. BRASSERT, OF CHICAGO, ILLINOIS, ASSIGNOR TO H. A. BRASSERT & COMPANY, OF CHICAGO, ILLINOIS, A CORPORATION OF ILLINOIS

APPARATUS FOR TREATMENT OF IRON ORE

Application filed February 4, 1929. Serial No. 337,221.

This invention relates to a new and improved apparatus for the treatment of iron ore, and more particularly to an apparatus wherein one chamber is provided for the reduction of the ore and a second chamber is provided for the melting of the ore.

The present method in general use for the reduction of iron ore involves the use of a blast furnace in which the ore is both reduced and melted. The blast furnace is a shaft type of furnace into which the ore, fluxing material and the fuel, consisting of coke, are introduced, and is uneconomical in operation as it requires approximately one ton of coke to reduce and melt one ton of pig iron. The reducing portion of the operation is carried on in the upper part of the blast furnaces by means of the carbon monoxide gas which is produced by the partial combustion in the lower portion of the furnace. Reduction also takes place by means of the solid carbon of the fuel at high temperatures lower in the furnace. The indirect reduction by means of the carbon monoxide gas takes place at low temperatures while the direct reduction by means of the solid carbon takes place at high temperatures. High temperatures are unnecessary, however, for the reduction which can be carried out by the indirect method. Theoretically, if both the reduction and the melting process could be carried on independently with the greatest possible economy of heat, the process could be carried through with about one-third the amount of the fuel used in normal blast furnace operation.

The product of the blast furnace is pig iron which, according to the usual practice, contains approximately 4% of carbon. In the manufacture of steel it is necessary to eliminate the greater portion of this carbon and such elimination in the open hearth process usual in steel making requires the greater part of the time involved in that process. Consequently if a pig iron can be produced economically which has a carbon content materially less than the usual 4%, the time and cost of the final steel making step in the open hearth furnace can be materially reduced. The reduction in the time for each open hearth heat will reduce all expenditures for fuel, labor, maintenance and overhead charges. It is impossible, however, to economically produce a pig iron having a carbon content materially below 4% in the blast furnace of the present type, using solid fuel. The carbon content can be very materially reduced, however, by means of processes which eliminate the solid fuel from the furnace charge, or greatly reduce the solid fuel. Such processes involve the combustion of fuel externally of the furnace itself, the highly heated products of combustion being introduced into the furnace. The combustion may be so regulated that the products of combustion may be oxidizing, neutral, or reducing in their effect. By using pre-heated air and carrying the combustion of the powdered coal or other fuel on under pressure, I am able to produce temperatures sufficiently high to permit the melting of iron of very low carbon content approaching and within the limits of steel. By this method, the use of the open hearth step in the production of steel may be eliminated entirely, and steel may be produced in one continuous operation from the iron ore and reduced iron.

My method is preferably carried on in two stages or steps, the first step involving the reduction of the ore and the second step the melting of the reduced ore. By carrying these two steps on in separate chambers, I am able to carry out each step under the most economical temperature conditions.

My method has been disclosed in my copending application Serial No. 332,570, filed January 14, 1929.

It is an object of the present invention to provide a new and improved apparatus for the treatment of iron ores wherein one chamber is provided for the reduction of the ore and a second chamber for the melting thereof.

It is a further object to provide apparatus of this character in which the reduction and melting are carried out in separate chambers and under different heat conditions and different characters of atmospheres.

It is a further object to provide an apparatus adapted for the production of iron low in carbon, approaching or within the limits of steel.

Other and further objects will appear as the description proceeds.

I have shown somewhat diagrammatically in the single figure of the accompanying drawings, one form of apparatus for carrying out my invention.

In the drawings, the lower melting chamber 11 is generally similar to a small blast furnace and is provided with a closed bottom 12, a cinder notch 13, and a plurality of tuyères 14, which are preferably water cooled. In addition water cooled bosh plates 15 may be provided if desired. A plurality of combustion chambers 16 are located adjacent the melting chamber 11 and are connected thereto by means of passages 17 leading through the tuyères 14 for the introduction of products of combustion into the melting chamber.

The combustion chambers 16 are provided with air for combustion through the bustle pipe 18 and the connections 19, the latter being controlled by valves 20. The fuel is introduced through a second bustle pipe 21 and passages 22 controlled by valves 23. This fuel may be powdered coal or slack, coke breeze, oil or gas, or any other suitable fuel. The combustion chambers are provided with the intakes 24 for the introduction of secondary air. The top of the vertical melting chamber 11 is provided with the offtake flue 25.

Superposed upon the vertical melting chamber 11 is a reducing chamber 26. This chamber is provided with the interior vanes 27 which slope downwardly and cooperate with the interior bells 28. These bells are carried by a sleeve 29 and may be raised or lowered by means of gear 30 cooperating with the upper end of the sleeve.

The revolving bell 31 is carried by vertical shaft 32 which extends up through the sleeve 29 and is shown as provided at its upper end with the gear 33 which meshes with the driving gear 34. By this means, the bell 31 may be rotated. It will be understood that the shaft 32 may be provided with any usual means for raising and lowering the bell in the charging of the melting chamber from the reducing chamber. Such constructions are old in the art and the details thereof form no part of the present invention. The bell 31 cooperates with the usual form of hopper 35.

The bell 36 cooperates with the hopper 37 at the upper end of the reducing chamber 26 to close the top of the chamber and to admit air thereto. This bell 36 is carried by a sleeve 38 which may be provided with any suitable means for raising and lowering it. The offtake 39 is connected to the upper end of the chamber 26 and serves to carry off the waste gases.

The lower end of the reducing chamber 26 is connected by gas intakes 40, with a bustle pipe 41 which is fed with reducing gases through the intake passage 42.

The offtake pipe 25 from the melting chamber is shown as connected to a recuperator 43 which is provided with the waste gas outlet 44. This recuperator 43 serves to heat the intake air which enters the recuperator through the passage 45, and goes from the recuperator through passage 46 to the air bustle pipe 18.

In the operation of my apparatus the ore to be treated will be introduced through the upper charging bell 36 into the reducing chamber 26. The ore will pass down upon the baffles 27 and the small interior bells 28 to finally bring up against the bottom charging bell 31. It will be understood that the small bells 28 may be raised or lowered to increase or decrease the rate of flow and also to provide any desired clearance between the bells and the vanes 27. In this manner the time and amount of contact between the reducing gases and the ore may be regulated as desired.

The reducing gases will pass upwardly through the ore from the intakes 40 and pass out of the top of the reducing chamber 26 through passage 39. These reducing gases may be procured from any desired source, and may, if desired, consist of the products of combustion of the melting chamber 11. In this case the gases will ordinarily be treated in order to increase their carbon monoxide content since from the nature of the combustion and operation in the melting chamber, this content will be low in the present case.

From the reducing chamber 26 the reduced ore is periodically deposited into the top of the vertical melting chamber 11. The distribution in this chamber may be facilitated by rotation of the bell 31 which is irregular in form. Combustion is carried on in the combustion chambers 16 by means of air introduced therein from the air pipes 19 and fuel introduced through the air pipes 22. Any suitable burner or nozzle may be used in the chamber, depending upon the nature of the fuel. Secondary air may be introduced through passages 24 to render the combustion substantially complete before the products of combustion enter the bottom of the melting chamber.

Due to the nature of the ore, it is usually preferable to fill the bottom portion of the melting chamber with coke upon which the ore rests. The coke mass serves to distribute the products of combustion throughout the area of the ore and it is substantially uniformly operated upon. Since the combustion is substantially complete at the time the heated gases enter the melting chamber, this coke is not rapidly burned and will only need replacement at long intervals. In order to insure this replacement, a very small portion of coke may be charged with the ore into the melting chamber if desired.

While I have shown a preferred embodiment of my invention by way of illustration, the construction may be varied to meet different conditions and operating requirements, and I contemplate such changes and modifications as come within the spirit and scope of the appended claim.

I claim:

Apparatus for the treatment of iron ore comprising a vertical reducing chamber, means for passing reducing gas through said chamber, baffles for deflecting the flow and for controlling the rate of flow of ore through the reducing chamber, a vertical melting chamber below the reducing chamber, means for controlling the gravity flow of material from the reducing to the melting chamber and for cutting off communication between the two chambers, combustion chambers adjacent the melting chamber, and tuyères for passing heated products of combustion from the combustion chambers through the ore in the vertical melting chamber.

Signed at Chicago, Illinois, this 31st day of January, 1929.

HERMAN A. BRASSERT.